May 10, 1955
P. TRAUGOTT
2,707,947
BASAL METABOLISM MEASURING APPARATUS
Filed Nov. 15, 1950
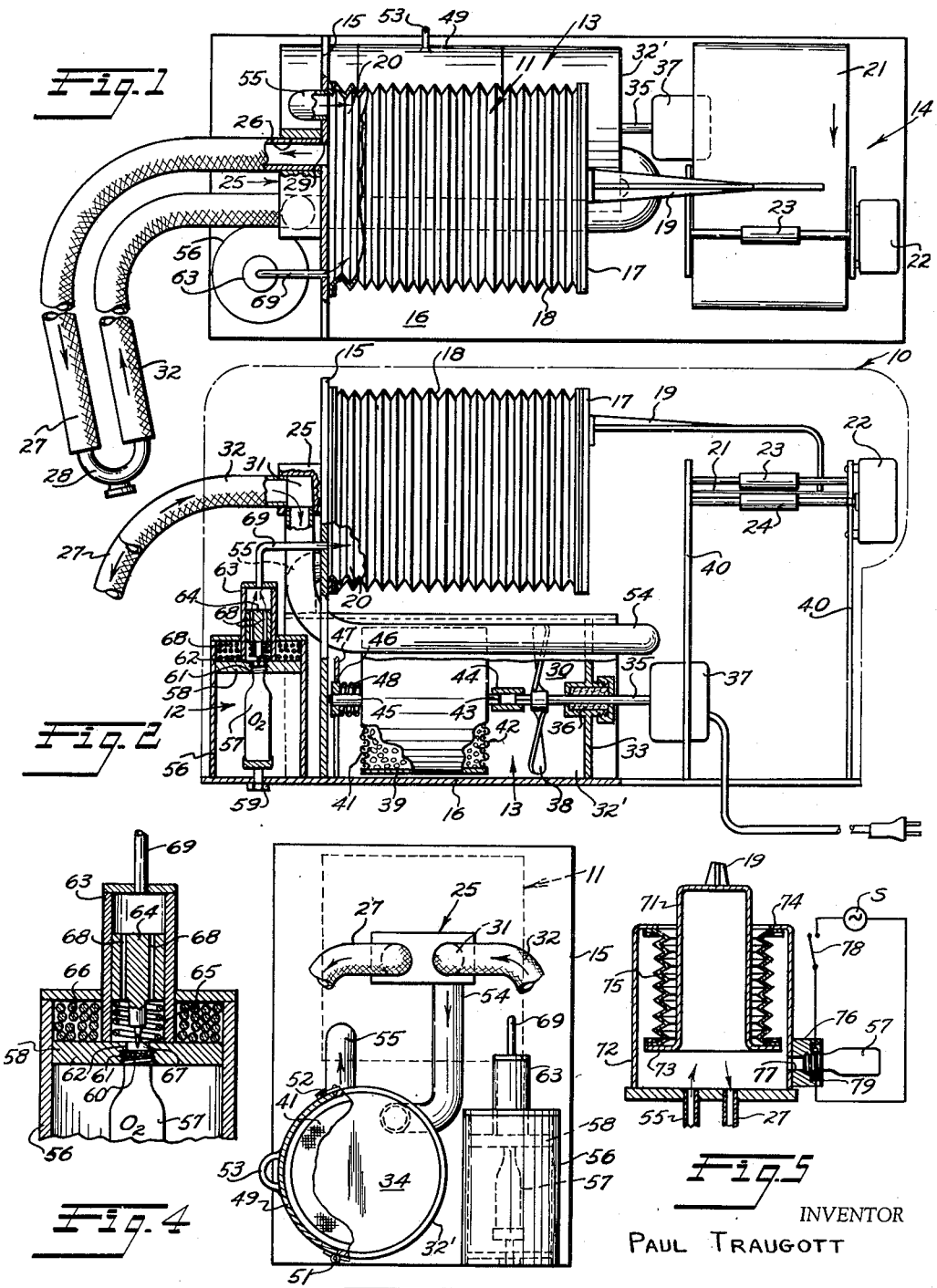
INVENTOR
PAUL TRAUGOTT
BY Strauch, Nolan & Diggins
ATTORNEYS

United States Patent Office 2,707,947
Patented May 10, 1955

2,707,947
BASAL METABOLISM MEASURING APPARATUS

Paul Traugott, Greenwich, Conn., assignor to Electro Physical Laboratories, Inc., Rye, N. Y., a corporation of New York Application November 15, 1950, Serial No. 195,831

6 Claims. (Cl. 128—2.07)

This invention relates to basal metabolism apparatus and particularly to such wherein special control of the oxygen is obtained.

In one type basal metabolism apparatus in common use today, a large supply of oxygen is contained under pressure in a relatively large tank from which measured amounts are extracted for introduction in expanded condition into the spirometer chamber. Usually a valve controls a passage between the tank and the chamber and an attendant opens the valve to admit the required volume of oxygen into the chamber, with the aid of a suitable indicator, and then shuts off the valve. This method has proved unsatisfactory because of the possibility of leakage at the valve and passage, the possible improper calibration of the indicator and the chance of human error in reading the indicator. Some of these possibilities of error have been lessened by special attachments and arrangements of controls but all of these expedients add to the cost of the apparatus and none insure that an accurately measured amount of oxygen can be obtained every time.

The present invention has for its major object a novel basal metabolism apparatus wherein only a predetermined amount of oxygen can be introduced into the measuring chamber thereby eliminating all chances of human or mechanical error.

A further object is to provide a novel basal metabolism apparatus wherein a relatively small replaceable cartridge or like vessel holding a predetermined amount of oxygen under pressure is mounted in association with a measuring chamber.

It is a further object of the invention to provide a novel device for opening such a cartridge to permit expansion of said predetermined amount of oxygen into the measuring chamber.

Another object of the invention is to provide a novel light weight portable basal metabolism measuring apparatus.

It is a further object of the invention to provide a novel basal metabolism measuring apparatus wherein a quantity of material for extracting carbon dioxide is mounted in a continuously shiftable container for more efficient utilization of said material.

A further object of the invention is to provide a novel basal metabolism measuring apparatus having a readily removable and replaceable cartridge of soda lime or the like.

Further objects of the invention include the novel association of the herein disclosed parts and will presently appear in connection with the annexed specification and the accompanying drawings wherein:

Figure 1 is a relatively diagrammatic plan view partly in section of a portable basal metabolism apparatus according to a preferred embodiment of the invention;

Figure 2 is a partly sectional side elevation of the apparatus of Figure 1;

Figure 3 is an end elevation partly in section of the apparatus;

Figure 4 is an enlarged detail of the oxygen cartridge opening device; and

Figure 5 is a sectional diagrammatic view of a further spirometer chamber arrangement.

In its preferred embodiment the spirometer or basal metabolism measuring apparatus of the invention comprises an expansible bellows assembly 11, a source of oxygen 12, a device 13 for extracting exhaled carbon dioxide, a measuring and recording instrument 14 and suitable connections between them as will appear.

The bellows assembly 11 comprises an end wall 15 vertically rigid with a horizontal support platform 16, a movable end wall 17 and a self supporting flexible wall or bellows 18 between walls 15 and 17. A cover 10 having a suitable carrying handle cooperates with the platform 16 to enclose the parts for portability. Movable end wall 17 has secured to it a pen arm 19 that writes upon a chart 21 driven at a constant linear speed by a clockwork 22. Preferably the chart is driven by a friction roller pass comprising an upper idler roller 23 and a lower roller 24 driven by the clockwork 22. The chart and pen arm move in directions at right angles to each other so that as wall 17 reciprocates during operation a continuous record will be traced on the moving chart.

If desired the chart arrangements may be similar to those disclosed in United States Letters Patent No. 2,221,482 issued to H. M. Jones on November 12, 1940.

A manifold 25 is secured upon wall 15 externally of the bellows chamber 20 and contains a through aperture 26 into which is snugly fitted an end of a flexible conduit 27 leading to a face mask 28. Aperture 26 is aligned with an aperture 29 in wall 15 to enable flow of air out of the chamber 20 through conduit 27 to the face mask.

Manifold 25 is provided with an internal chamber 31 that communicates with a flexible conduit 32 also leading to the face mask 28, so that exhaled air is delivered to chamber 31.

The carbon dioxide removal device 13 comprises a cylindrical tank like member 32' having opposite air tight end walls 33 and 34. End wall 33 rotatably supports a shaft 35 journaled in an air tight packing 36 and driven by an external motor 37 that is mounted on the frame that supports the chart assembly. Internally of carbon dioxide removal chamber 30, a fan 38 is fixed on shaft 35.

A cartridge barrel or cage 39 having wire end walls 41 and 42 is filled with treated granular soda lime which is calcium oxide and sodium hydroxide. At one end barrel 39 has a central stub shaft 43 slidably but non-rotatably secured to shaft 35 as by a coupling 44. At its other end barrel 39 has a coaxial stub shaft 45 journaled in a support bearing 46 mounted in a spider 47, and a compression spring 48 urges the barrel toward the coupling 44. A door 49 hinged in the wall of tank 32 at 51 and latched at 52 may be opened by handle 53 for ready removal of cartridge barrel 39 whenever the soda lime is spent. The slide fit between stub shaft 43 and 45, bearing 46 and the coupling enables this replacement feature.

As illustrated in Figures 2 and 3, the chamber 30 is connected to manifold chamber 31 by a conduit 54 that opens into chamber 30 through wall 33. At the other end of chamber 30, a conduit 55 extends up and through a suitable aperture in wall 15 to open into bellows chamber 20 as shown in Figure 1. Thus exhaled air delivered to chamber 31 flows through conduit 54 and traverses chamber 30 before reentering chamber 20 through conduit 55.

The source of oxygen indicated at 12 comprises a frame 56 wherein a pressure vessel or cartridge 57 containing an accurately known volume of oxygen under pressure is held between a support 58 and a releasable clamp 59. Support 58 is a plate having a socket 61 to tightly receive and locate the neck of vessel 57 and an outlet bore 62. For example vessel 57 may have an externally threaded neck screwed into a threaded socket 61 with a resilient gasket to make the joint air tight.

Above bore 62 a closed cylinder 63 is seated on support 58 and a vertically slidable piston or plunger 64 is mounted within the piston, being urged to its upper positions of Figure 2 by an expanded compression spring 65. Cylinder 63 is of non-magnetic material and piston 64 is of iron or other magnetic material so that, when the surrounding coil 66 is energized, piston 64 acts like a solenoid armature and is pulled quickly downwardly against the force of spring 65.

The mouth of vessel 57 is closed by a pressure tight but frangible seal 60 which is broken by the blow of the pointed projection 67 on the downwardly moving piston 64. In practice solenoid coil 66 need be energized only momentarily as by a push button control and the spring then retracts the plunger to permit free escape of the oxygen into cylinder 63. As illustrated in Figure 2, plunger 64 is longitudinally apertured at 68 to permit free flow of the expanding oxygen up through the cylinder and into a conduit 69 opening into the top wall of cylinder 63 which leads the oxygen directly through wall 15 into the bellows chamber 20. An air filter may be used in cylinder 63.

In operation face mask 28 is attached to the patient, the chart assembly 14 is readied, the motor 37 started, and then the oxygen vessel is opened by the solenoid control to release the oxygen into bellows chamber 20. This provides an exactly predetermined amount of oxygen in the bellows chamber, in the usual case a liter, and the test proceeds to determine, among other things just how long it takes the patient to consume the liter of oxygen. A record is made directly on the moving chart by the pen which follows movement of the bellows in response to respiratory action of the patient. This record is preferably made by a heated point pen on a chart having a treated surface coating that is thermally reactive to the heated stylus and thus a direct reading is produced.

The exhaled air passes through conduit 32, chamber 31, and conduit 55 into chamber 30 where it is forced by fan 38 through the soda lime cage. It is an important part of the invention that I provide a soda lime cartridge which is constantly rotated during the test, thereby enabling the most efficient usage of the soda lime by exposing a maximum surface area and preventing solid caking, and also the cartridge is readily and easily removable through door 49 when used up. These features are entirely new and have never been available in such apparatus.

The general desirability of fan operation to aid air circulation has been suggested, as in United States Letters Patent to Perrill No. 2,192,799, but the association of fan driven air and a driven tumbler arrangement for the soda lime has not heretofore been suggested and it enables a greater air handling capacity with apparatus of smaller dimensions than heretofore used. This is quite important in portable apparatus.

A major aspect of the invention is the injection of an accurate amount of oxygen into the spirometer test, thus eliminating human and mechanical error. The weight of a vessel containing a liter of oxygen is small, and this is another feature contributing to the portability of the apparatus.

The above described apparatus, besides being more efficient than those heretofore used, is sufficiently light in weight to be portable, and the practitioner may carry it around in his car to visit homes, thereby avoiding the usual hospital visit needed for metabolism tests in the past, which was heretofore necessary because of the heavy frame and oxygen tank arrangements in conventional use.

Figure 5 illustrates a bell type form of spirometer usable in the invention wherein the cylindrical bell 71 is reciprocable with respect to a surrounding cylinder 72 rigid with a suitable support. The cylinders have oppositely facing end flanges 73 and 74 that are connected by a flexible bellows sleeve 75 which is air tight and sealed to the flanges and permits reciprocation of bell 71 as the patient breathes. This form of spirometer is more efficient and less heavy than the water sealed bell type commonly used.

Another arrangement for introducing the oxygen into the spirometer chamber is also shown in Figure 5. The flask or cartridge 57 is mounted in the threaded socket flange 76 as before but flange 76 surrounds a bore 77 opening directly into the interior of the spirometer. In this instance the mouth of flask 57 is sealed by a thermally sensitive solid which melts at a fairly low temperature above room level, and a coil 78 energized from a source S by a switch 79 may be momentarily energized to melt the seal and open the flask when desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In basal metabolism apparatus, a support, relatively removable members on said support enclosing a variable volume chamber, a socket on said support, a passage between said socket and said chamber, means in said socket for releasably mounting a vessel containing a predetermined amount of oxygen, and means coacting with said socket for rupturing said container to release all of said oxygen through said passage into said chamber.

2. In a spirometer, relatively movable members enclosing a variable volume chamber, an indicator connected to one of said members, a conduit for connecting the chamber to the respiratory system of a patient under test, a socket having a connecting passage to the spirometer chamber, means for mounting the neck of a small vessel containing a predetermined amount of oxygen sufficient for one test in air tight relation in said socket, and an operator controlled solenoid mounted adjacent said socket having a plunger adapted to engage and open said vessel.

3. In a spirometer, relatively movable members enclosing a variable volume chamber, an indicator connected to one of said members, a conduit connecting the chamber to the respiratory system of a patient under test, a socket having a connecting passage to the spirometer chamber, means for mounting the neck of a small vessel containing a predetermined amount of oxygen sufficient for one test in air tight relation in said socket, a vessel puncturing element mounted on said socket, and manually controlled means for relatively moving said vessel and element for puncturing the latter without destroying the air seal and for releasing said oxygen directly into said passage.

4. Portable basal metabolism apparatus comprising a support, means on said support defining an expansible and contractible chamber, a test subject conduit connected to said chamber, a test indicator operably connected to said chamber defining means, a socket on said support, a passage separate from said conduit leading from said socket to said chamber, means for mounting a small cartridge containing only enough oxygen under pressure for a single basal metabolism test on said socket so as to close the adjacent end of said passage, and means operable through said passage for puncturing said cartridge to release all of the oxygen therefrom into said chamber.

5. In a basal metabolism machine, a support, a bellows on said support enclosing a chamber, a recorder connected to said bellows, a receptacle on said support connected by a passage to said chamber, a small cartridge containing a charge of oxygen under pressure just sufficient for a single test in said machine removably mounted in said receptacle and closing the adjacent end of said passage, and means on said support manually controlled by an operator for opening said cartridge to release all of said oxygen directly into said chamber comprising means in said passage adjacent said receptacle for puncturing the cartridge.

6. In the basal metabolism machine defined in claim 5, a resilient gasket in said receptacle for engaging said cartridge for providing an air tight connection with said passage.

References Cited in the file of this patent

UNITED STATES PATENTS

| | | |
|---|---|---|
| 853,402 | Foregger | May 14, 1907 |
| 2,180,057 | Jones | Nov. 14, 1939 |
| 2,192,799 | Perrill | Mar. 5, 1940 |
| 2,221,482 | Jones | Nov. 12, 1940 |
| 2,428,425 | Levitt | Oct. 7, 1947 |